United States Patent [19]

Ishii

[11] Patent Number: 5,057,972
[45] Date of Patent: Oct. 15, 1991

[54] ELECTROLYTIC CAPACITOR

[75] Inventor: Kazuo Ishii, Tokyo, Japan

[73] Assignee: Jelmax Co. Ltd., Shinbashi, Japan

[21] Appl. No.: 674,100

[22] Filed: Mar. 25, 1991

[51] Int. Cl.$^5$ ............................................. H01G 9/02
[52] U.S. Cl. ..................................... 361/512; 361/524
[58] Field of Search ...................... 361/512, 504–507, 361/524, 313–315

[56] References Cited

U.S. PATENT DOCUMENTS 4,351,709 9/1982 Goetz ............................. 204/180 R
4,593,343 6/1986 Ross ..................................... 361/512

Primary Examiner—L. T. Hix
Assistant Examiner—Le Nguyen
Attorney, Agent, or Firm—Hopgood, Calimafde, Kalik, Blaustein & Judlowe

[57] ABSTRACT

An electrolytic capacitor comprising a pair of electrode foils, an oxide layer provided on the surface of at least one of said electrode foils, an ion permeable capacitor paper interposed between said pair of electrode foils, an electrolyte being impregnated into the capacitor paper. The capacitor paper contains hydrogen reducing fine particles consisting of palladium, platinum or an alloy of both. The hydrogen reducing fine particles are distributed in the capacitor paper in an amount between 0.1 and 1% by weight based on the weight of said capacitor paper.

5 Claims, 4 Drawing Sheets ific devices.

ELECTROLYTIC CAPACITOR

BACKGROUND OF THE INVENTION

This invention relates to an improvement of an electrolytic capacitor used for electronic devices.

A conventional electrolytic capacitor comprises a pair of electrode foils, an oxide layer provided on the surface of at least one of the electrode foils, an ion permeable capacitor paper interposed between the pair of electrode foils, a liquid electrolyte being impregnated into the capacitor paper, the lamination of the electrode foils and the capacitor paper being wound into a roll and hermetically sealed into a metal container with a gas permeable packing member, and a pair of lead wires led from each of the electrodes to outside of the container through the packing member.

Solutions of electrolytes such as a bolic acid or adipic acid solved in a solvent such as ethylene glycol or dimethyl formamide have been used as the electrolyte liquid. These solutions has an ion conduction property mainly through $(OH)^-$ ion. When an alternate electric current flows through the capacitor, ions collide with the capacitor paper or the electrodes to generate oxygen and hydrogen through electrolysis. oxygen thus generated is usually absorbed by the electrodes thereby restoring the oxide layer. Hydrogen generated is, however, stored in the container resulting in a rise of inner pressure. The hydrogen is generated in proportion to the electric current, a temperature and a time and is discharged out of the container. The electrolyte is consumed in accordance with the discharge of the hydrogen. The capacitor ends its life when the electrolyte is exhausted.

An impedance characteristic is usually measured by means of flowing no signal currents. In operation of the capacitor, however, an alternate electric current flows through the capacitor. Ions move in accordance with an intensity of the electric current thereby generating hydrogen gas bubbles continuously. The bubbles stick to fibers constituting the capacitor paper thereby blocking the flow of the ion current. This phenomenon is remarkable at such low voltages as under the voltage of ten and several volts. This means that the ion conduction efficiency decreases. As a result, an internal impedance is greatly increased by the hydrogen gas generated in proportion to an electric current and a temperature when a signal current flows in the actual operation.

Those electrolytic capacitors, when used in a power supply for a high output power amplifiers, decrease an output power of the amplifier by the increase of the internal impedance in operation by more than ten times as high as the internal impedance at the time of measurement.

There has been no method for effectively solving the problem mentioned above. It has been tried to decrease the hydrogen gas by mixing the electrolyte with a liquid material reacting the hydrogen gas. Such liquid material, however, could not be used with enough amount because it degrades the electric or temperature characteristic of the electrolyte. Therefore, such liquid material has been hardly used for high quality electrolytic capacitors because it is acting rather harmfully. There has been also no effective means to cope with the problem of shortening of the life of the capacitor resulting from the generation of the gas.

SUMMARY OF THE INVENTION

It is an object of the present invention to provide an improved electrolytic capacitor capable of solving the problems in the prior art described above.

According to the present invention, an electrolytic capacitor is provided comprising a pair of electrode foils, an oxide layer provided on the surface of at least one of the electrode foils, an ion permeable capacitor paper interposed between the pair of electrode foils, an electrolyte being impregnated into the capacitor paper, the capacitor paper containing hydrogen reducing fine particles consisting of palladium, platinum or an alloy of both distributed therein in an amount between 0.1 and 1% by weight based on the weight of the capacitor paper.

According to another aspect of the present invention, an electrolytic capacitor is provided having a capacitor paper containing graphite fine particles distributed therein in an amount between 0.5 and 7% by weight based on the weight of the capacitor paper.

DESCRIPTION OF THE PREFERRED EMBODIMENT

When an alternate electric current flows through the electrolytic capacitor according to the present invention, an ion current collides with fibers consisting of the capacitor paper to cause an electrolysis. Oxygen generated by the electrolysis is absorbed by the oxide layer. Hydrogen gases thus generated are, on the other hand, brought into contact with, the palladium particles bound to the fibers. The palladium is known as a metal absorbing a hydrogen which shows a strong reducing effect to ionize hydrogen at a room temperature. The palladium, accordingly, acts as a strong catalyzer for the hydrogen to react with the oxygen the container. The generation of fine gas bubbles which eliminate the ion conduction efficiency are greatly suppressed and reduced.

Table 1 comparatively shows leakage currents of a conventional capacitor A, capacitors B and C of the present invention at a minute later. The capacitors A, B and C are made of the same material and with the same manufacturing process. Five samples are prepared for each capacitor A, B and C and the average values of each five samples are shown as leakage currents in the Table 1. In the Table 1, it is seen that the leakage currents of the capacitors having a capacitor paper containing palladium of 0.4% by weight were reduced to about a half of the conventional capacitor. It is understood that the generation of the gas is remarkably reduced in the capacitors according to the present invention since the leakage current is usually related with the gas generated.

TABLE 1

| 25 v 220 F Leakage Current n = 5 | | | |
|---|---|---|---|
| | Conventional A | Invention B | Invention C |
| Palladium Added (weight %) | 0 | 0.4 | 0.4 (+graphite 4%) |
| Leakage Current A/minute | 4.6 | 2.9 | 2.51 |

Figure 1:
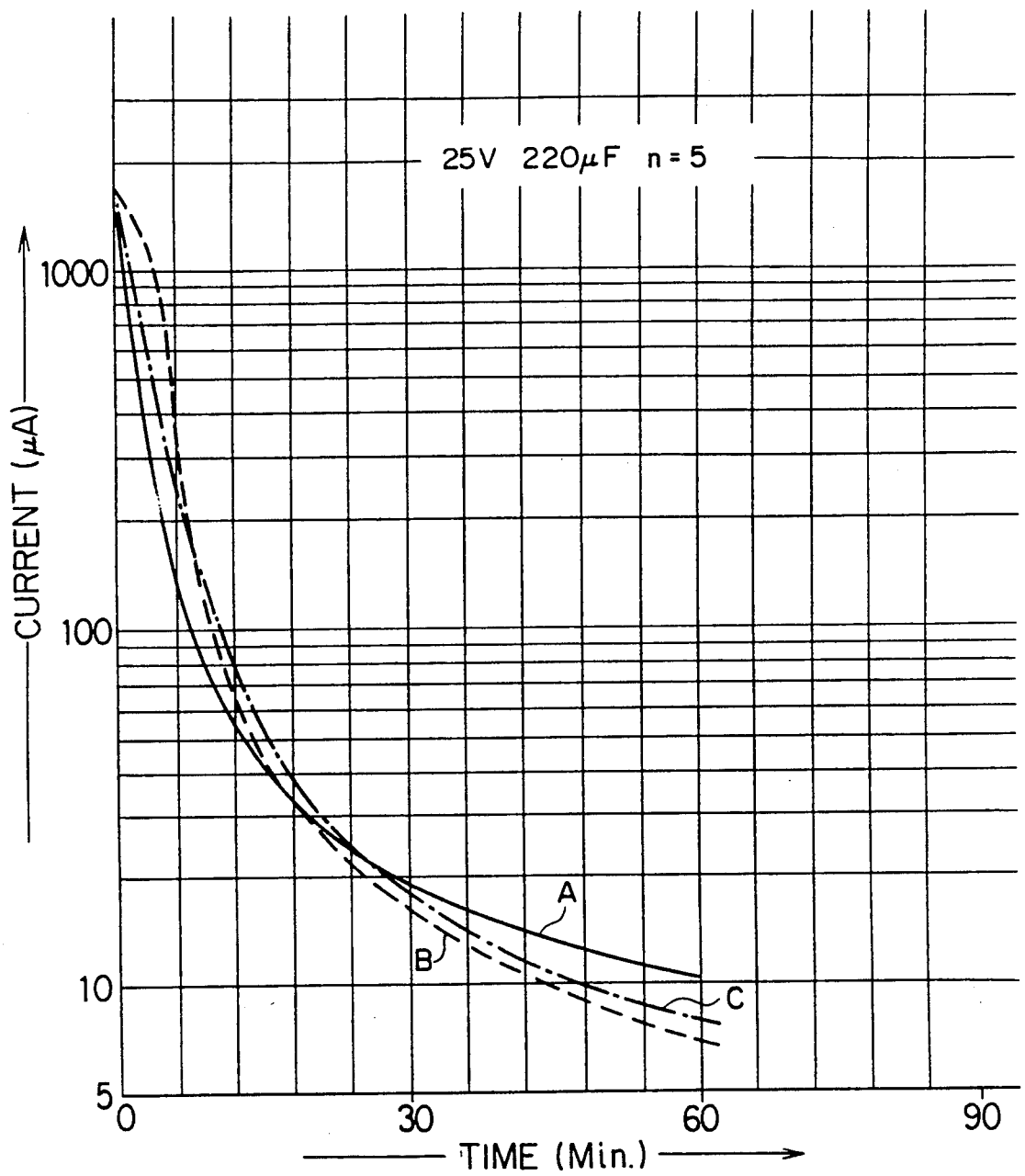
FIG. 1 is a graph showing variation in electric currents flowing through an electrolytic capacitors according to the present invention and of a conventional one in the aging process.

An aging step is applied at the end of manufacturing process of the capacitor in which a direct current voltage is applied to the electrodes for restoring the oxide layer damaged by the defects in the electrode foils. In the aging step, a fairly large amount of current flows at the initial period of the step through the capacitors B and C of the present invention compared with the conventional capacitor A as shown in FIG. 1. It is shown, however, from FIG. 1, that the currents flowing through the capacitors of the present invention rapidly decrease after a short period of time, about 15 minutes for example. This means that the oxide reaction proceeds quickly and greatly decreases the influence of the gas current.

Figure 2:
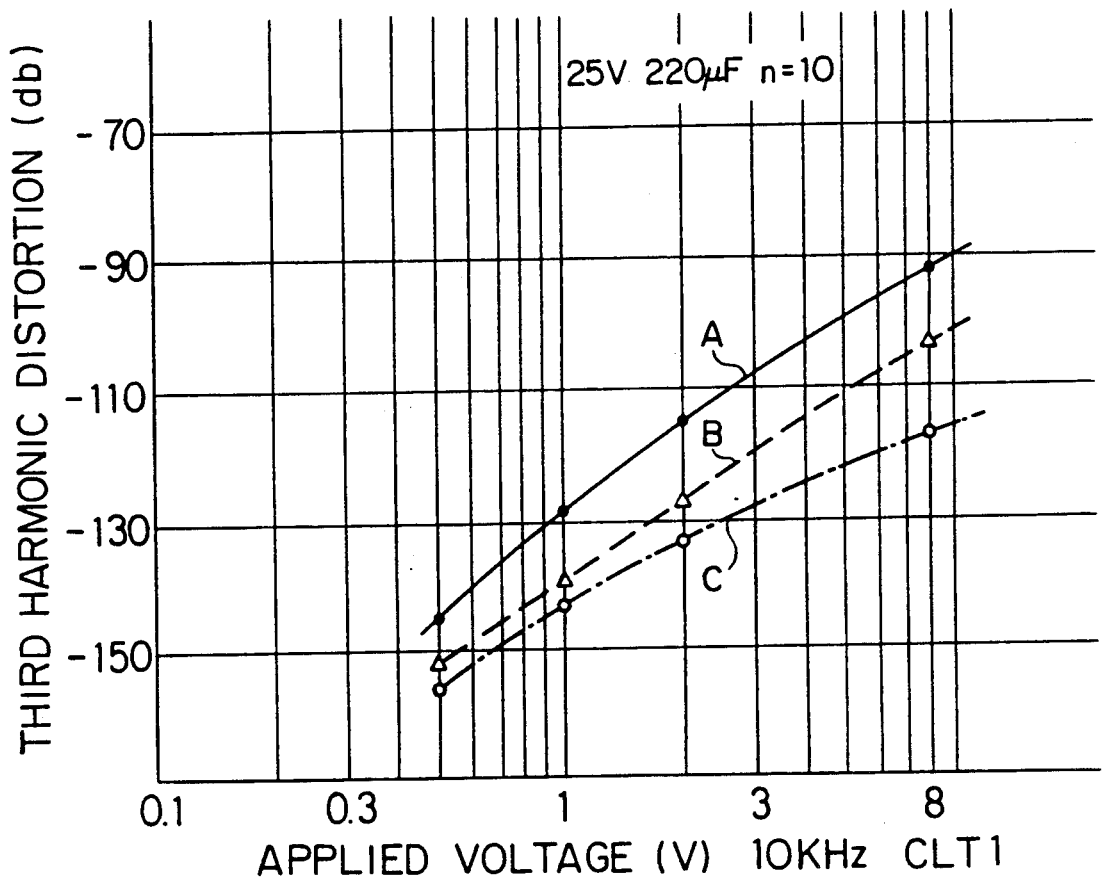
FIG. 2 shows a graph of characteristic curves illustrating a relationship between an applied voltage and a third harmonic distortion of the electrolytic capacitors according to the present invention and of the conventional one.

The harmonic distortion characteristics of the capacitor according to the present invention is then explained. It is understood from FIG. 2 that the amount of the third harmonic distortion of the capacitor B of the present invention generated by an applied voltage is greatly decreased compared with the conventional capacitor A. Further, the capacitor C of the present invention showed the best distortion characteristics wherein the amount of the distortion is further reduced. The capacitor C is made by Jelmax Co., Ltd. and is called by the trademark as "Black Gate". The capacitor C includes a capacitor paper containing 4% of graphite fine particles and 0.4% of palladium based on the weight of the capacitor paper.

A remarkable improvement in sound quality was recognized when these capacitors B and C of the present invention were used in an audio amplifier. A great improvement in picture quality was also achieved with improved color brightness when they were used in a television receiver. A very high quality of output is reproduced with very little phase shift in digital signals when they were used in digital circuits in a CD player.

A 10V, 2200 μF electrolytic capacitor for filtering an output in a switching power source device having a switching frequency of 100 kHz was replaced by a 16V, 470 μF electrolytic capacitor of the present invention. Output ripple noises were reduced from 38 mV to 4.8 mV as shown in Table 2.

TABLE 2

| Ripple noises in a 100 kHz switching power supply Input AC 100 V, Output 5 V, 5 A, Load Current 1 A | | |
|---|---|---|
| | Capacitance of the output circuit | Output ripple noise |
| Conventional Capacitor | 10 V 2200 μFx2 | 38 mV |
| Capacitor of Invention | 16 V 470 μFx2 | 4.8 mV |

Switching power source devices of this kind were widely used in information handling apparatuses such as a computer. The power source devices, however, had a problem that they generated large output ripple noises of several tens mV which adversely affected not only the apparatuses incorporating the power source devices but also other electronic devices using a common power source line because those conventional switching power source devices had low output direct voltages and capacitors of poor function.

The electrolytic capacitor of the present invention, however, extremely reduced the amount of the ripple noises even though the capacitance was as low as one fourth of the capacitance to be used. This is a great improvement because there has never been the case where that amount of noise is reduced before. It is apparent that the ripple noises will be reduced more if the capacitance is increased to an appropriate value and that the capacitor will be widely used in the power source devices for low noise electronic devices which have been unable to use the conventional capacitors because of the ripple noises.

Figure 3:
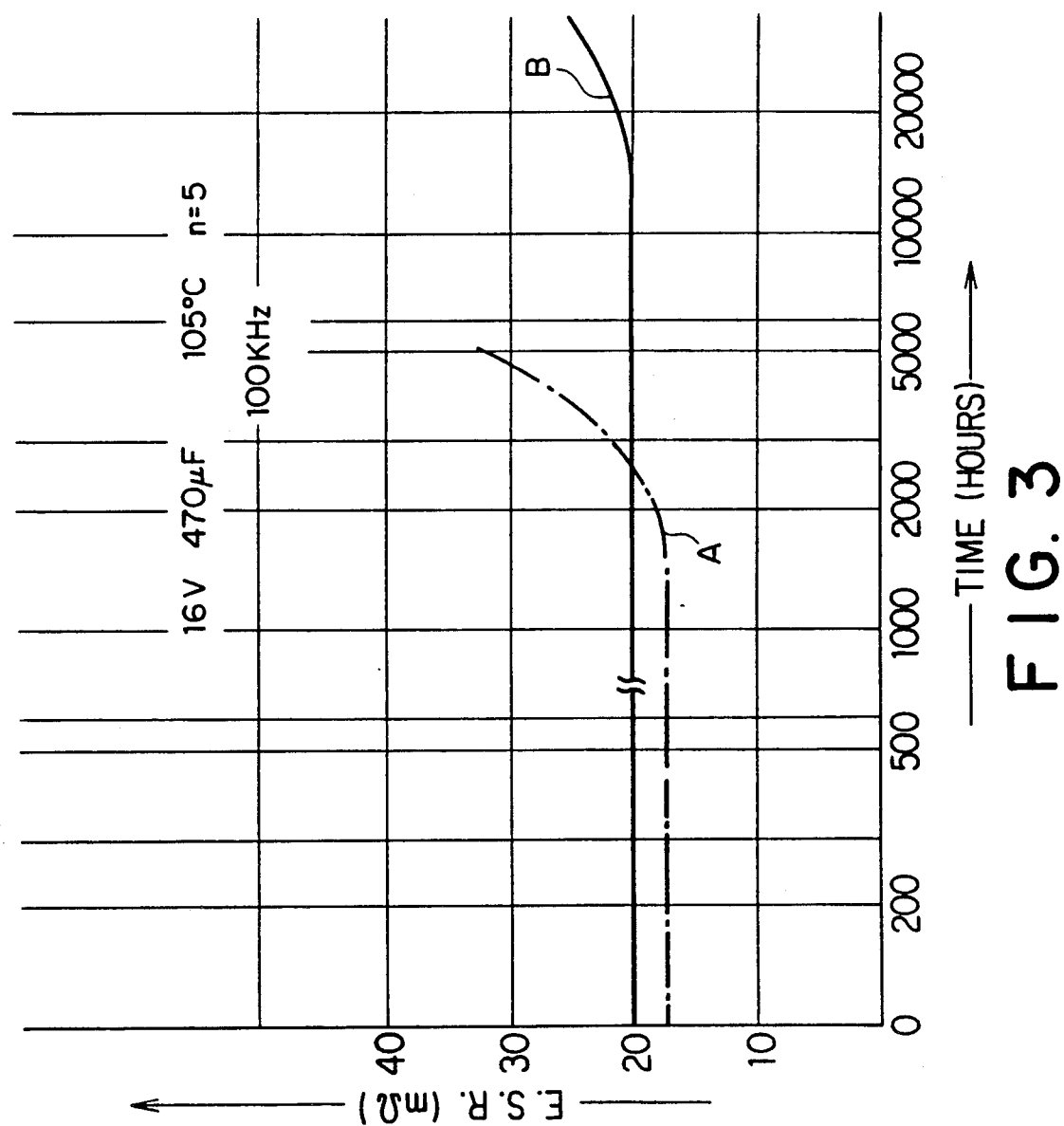
FIG. 3 is a graph showing results of life tests of the electrolytic capacitors according to the present invention and of the conventional one.

FIG. 3 shows the results of life tests of the capacitor B used for the power supply devices and a conventional capacitor A having the same standard. The capacitor of the present invention is able to maintain its ability of an equivalent series resistance (E.S.R.) for more than three times longer period than the conventional capacitor. It is confirmed that more than three times longer life is secured and that the exhaustion of the electrolyte by the generation of the oxygen in the interior of the capacitor is greatly improved.

It is disclosed that the capacitor paper used in the test in the embodiment of, the present invention contains 0.4 weight % of palladium fine particles bonded to the paper. It is expected, however, to have the same effect when the paper contains the palladium fine particles of more than 0.1 and less than 1 weight %. The generation of the gas can not effectively suppressed with the palladium fine particles of less than 0.1 weight %. With the palladium fine particles of more than 1 weight %, fine particles contact with each other to adversely affect the ion transfer thereby increasing the equivalent series resistance. It is, therefore, preferable to select the range of fine particles from 0.1 to 1 weight % since the ion transfer is not affected with the fine particles less than 1 weight %.

Platinum fine particles of the same amount as the palladium can be effectively bonded to the capacitor paper in accordance with the present invention. Although platinum has stronger reducing ability of hydrogen, it has a problem that the price is three times as high as palladium. Alloy fine particles of palladium and platinum has an intermediate effect corresponding to the amount of each component. Any of the above fine particles are not corroded by the electrolyte and do not have any special electric potential. They do not adversely affect an alternate current flowing through the capacitor because they do not have magnetism.

It is preferable to contain graphite fine particles of 0.5-7 weight % in the capacitor paper in the embodiment of the present invention in view of eliminating the signal distortion. The graphite fine particles may be distributed in the capacitor paper in advance and thereafter the fine particles of palladium or platinum are distributed. Both of the fine particles may be distributed in the capacitor paper to be bonded to the paper at the same time.

Figure 4:
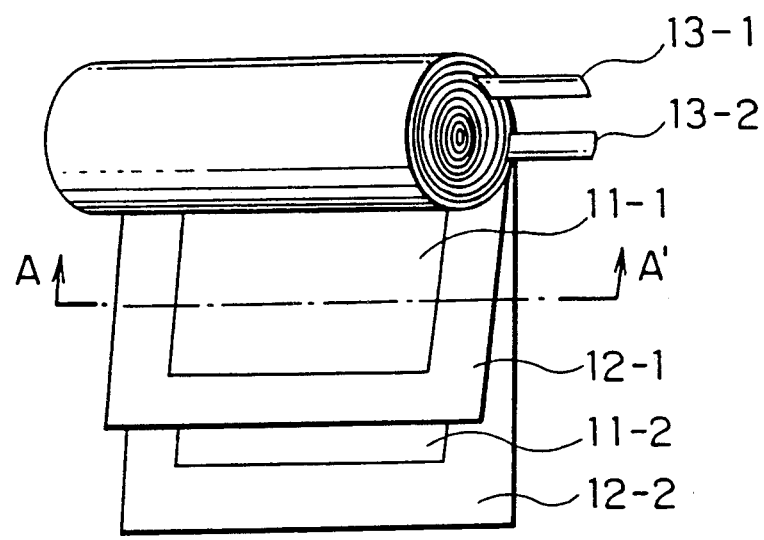
FIG. 4 is a partially developed view of the electrolytic capacitor according to the present invention.

Referring to FIG. 4, an electrolytic capacitor according to a preferred embodiment of the present invention comprises a pair of electrode foils 11-1 and 11-2 made of an aluminum foil respectively, an oxide layer (not shown) provided on at least one of the electrode foils and two sheets of ion permeable capacitor papers 12-1 and 12-2 such as Manila papers and the like comprising natural fibers as a main component interposed between the pair of electrode foils 11-1 and 11-2. Liquid electrolytes such as a bolic acid, adipic acid or the like solved in a solvent such as ethylene glycol, dimethyl formamide or the like are impregnated into the capacitor papers 12-1 and 12-2 which are laminated and rolled together to form a cylindrical electrolytic capacitor. Lead wires 13-1 and 13-2 are connected to each of electrode foils 11-1 and 11-2 respectively by means of welding and the like.

The capacitor papers 12-1 and 12-2 contain hydrogen reducing fine particles uniformly distributed in the capacitor paper. The fine particles comprise palladium, platinum or the alloy of both in an amount between 0.1 and 1% by weight based on the weight of the paper.

With respect to palladium, a water solution of palladium nitride added with tartaric acid or Rochelle salt is applied and pregnated to a capacitor paper. The palladium in a fine particle precipitates and is bound to around fibers constituting the paper through a reducing action of the tartaric acid by controlling in advance the weight of the palladium nitrite with respect to the capacitor paper. The capacitor paper applied with the water solution is then washed with pure water to remove nitrate and dried to complete the capacitor paper of the present invention. Some amount of residual acid hardly affects the capability of the capacitor. Fine particles distributed are firmly bonded to fibers and are not transferred by outer vibration.

With respect to platinum, a solution of chloroplatinum acid added with tartaric acid or Rochelle salt is applied and pregnated to inside and outside of the capacitor paper in the similar manner described above. The capacitor paper applied with the solution is then washed with pure water and dried to complete the capacitor paper of the present invention.

Fine particles of an alloy comprising palladium and platinum can be also distributed and bonded to the capacitor paper in the similar manner as described above.

Figure 5:
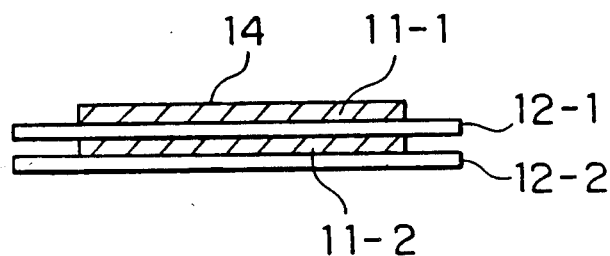
FIG. 5 is a sectional view of the electrolytic capacitor cut along the line A—A' in FIG. 4.

FIG. 5 is a sectional view of the capacitor taken along the line A—A' in FIG. 4. The electrolytic capacitor comprises a pair of electrode foils 11-1 and 11-2 made of an aluminum foil respectively, an oxide layer 14 provided on at least one of the electrode foils and two sheets of ion transferring capacitor papers 12-1 and 12-2 into which the electrolyte is impregnated.

The capacitor papers 12-1 and 12-2 consisting of fibers contain hydrogen reducing fine particles uniformly distributed therein. The fine particles comprise palladium, platinum or the alloy of both in an amount between 0.1 and 1% by weight based on the weight of papers.

It is preferable to uniformly distribute the hydrogen reducing fine particles comprising palladium, platinum or the alloy of both into the capacitor paper which has the distribution of the graphite fine particles of 0.5-7% by weight previously and uniformly distributed above or together with palladium platinum and/or the alloy in the capacitor paper. The capacitor paper is thus provided which is used for an electrolytic capacitor having extremely low noise characteristics according to the present invention.

What is claimed is:

1. An electrolytic capacitor comprising:
   a pair of electrode foils;
   an oxide layer provided on the surface of at least one of said electrode foils;
   an ion permeable capacitor paper interposed between said pair of electrode foils;
   an electrolyte being impregnated into said capacitor paper;
   said capacitor paper containing hydrogen reducing fine particles consisting of palladium, platinum or an alloy of both, distributed therein in an amount between 0.1 and 1% by weight based on the weight of said capacitor paper.

2. An electrolytic capacitor according to claim 1, wherein said hydrogen reducing fine particles are so distributed substantially uniformly as to be bound to fibers constituting said capacitor paper.

3. An electrolytic capacitor according to claim 1 or 2, wherein said capacitor paper contains graphite fine particles distributed therein in an amount between 0.5 and 7% by weight based on the weight of said capacitor paper.

4. An electrolytic capacitor according to claim 3, wherein said graphite fine particles are distributed in said capacitor paper in advance of or at the same time with the distribution of said hydrogen reducing fine particles.

5. An electrolytic capacitor according to claim 4, wherein said graphite fine particles are distributed in said capacitor paper so as to form substantially uniform distribution.

* * * * *

UNITED STATES PATENT AND TRADEMARK OFFICE
CERTIFICATE OF CORRECTION

PATENT NO. : 5,057,972

DATED : October 15, 1991

INVENTOR(S) : Kazuo Ishii

It is certified that error appears in the above-identified patent and that said Letters Patent is hereby corrected as shown below:

ON THE TITLE PAGE:   Insert the following:

--[30] Foreign Application Priority Date

April 11, 1990 [JP] Japan -----93966--

Signed and Sealed this

Second Day of March, 1993

*Attest:*

STEPHEN G. KUNIN

*Attesting Officer*   *Acting Commissioner of Patents and Trademarks*